United States Patent Office 2,820,699
Patented Jan. 21, 1958

2,820,699
ANTI-FOAMING MATERIAL
George M. Morris, Kansas City, Mo.
No Drawing. Application April 30, 1954
Serial No. 426,923
2 Claims. (Cl. 23—230)

This invention relates to antifoaming substances for the Kjeldahl nitrogen determination and packaging for the catalysts of the Kjeldahl nitrogen determination and refers more particularly to a material which markedly reduces foaming in the Kjeldahl nitrogen determination and additionally provides a packaging material which is inert to the Kjeldahl reaction and soluble in the Kjeldahl reagents.

When a protein sample is analyzed for nitrogen by the Kjeldahl method, it is first heated with concentrated sulphuric acid until it is completely digested. In this reaction, organic matter is oxidized to carbon dioxide and the nitrogen present is converted to ammonium nitrate, in which form it is ready for distillation after alkali (sodium hydroxide plus water) is added. A reference explaining the Kjeldahl method is C. A. Storvick, Journal American Dietetic Association, 10, 799 (1950).

In the early phases of digestion, the reaction mixture is black, but the color clears up toward the end, the removal of the last trace of gray indicating that the process is complete. With concentrated sulphuric acid alone, the digestion of the sample proceeds rather slowly. Its speed, however, has been greatly increased by adding several materials which speed the digestion, but do not interfere with the nitrogen determination. These are of two types, namely, specific catalysts such as copper, mercury and selenium; and alkali sulphates, such as potassium or sodium sulphate which are added simply to raise the boiling point of the digestion mixture. When properly aided, the digestion is usually complete in from one-half to one hour.

The Association of Official Agricultural Chemists recognizes three distinct methods for use in the Kjeldahl determination using catalysts alone or in combination with alkali sulphates and referred to as the Kjeldahl, the Gunning and the Kjeldahl-Gunning-Arnold methods. While these three procedures differ somewhat in the components used, they are essentially equivalent and the following remarks as to improvements applied to all three.

The following table gives the official digestion mixtures for the Kjeldahl nitrogen determination:

| Method | Sample Weight, gm. | Sulphuric Acid, ml. | Catalysts, gm. | Alkali Sulphate, gm. |
|---|---|---|---|---|
| Kjeldahl | .7–3.5 | 20–30 | .7 mercuric oxide or its equivalent in metallic mercury, .1–.3 $CuSO_4 \cdot 5H_2O$ may be used in addition or in place of mercury. | |
| Gunning | .7–3.5 | 15–25 | .1–.3 crystalline copper sulphate (optional). | 10 powdered $K_2SO_4$ or anhydrous $Na_2SO_4$. |
| Kjeldahl-Gunning-Arnold. | .7–3.5 | 25 | 1 copper sulphate or about .7 mercuric oxide (or its equivalent in metallic mercury). | 15–18 $K_2SO_4$ or anhydrous $Na_2SO_4$. |

To complete the determination of nitrogen, the clear digestion mixture is cooled, diluted with distilled water and made strongly alkaline with sodium hydroxide. Aids to distillation, such as zinc and pumice are usually added. A quantity of water is then distilled from the alkaline mixture into a receiving flask containing a solution of acid. The ammonia resulting from the digestion of protein and other nitrogen containing compounds is carried over into the receiver quantitatively in this distillation. Here it is trapped by the acid and the amount present can be determined by titration.

Many food and feed stuffs can be carried through the procedure without trouble; others, however, given difficulty due to foaming of the solutions. In the digestion, the long neck spherical flask containing the digestion mixture is tilted and heated on the side using an electric heater or gas flame. In a satisfactory digestion, foam rises only an inch or two above the black, tarry digestion mixture, then rolls over or breaks and returns. With troublesome samples, however, the amount of foam and froth is excessive. It rises high within the flask, sometimes well into the neck, and may remain high during a large portion of the digestion. Tarry material also sticks to the sides of the flask after the foam subsides. The separation, as foam, of material from the hot mixture near the heater considerably increases the time needed for digestion.

It is hard to generalize in what types of materials foam forms excessively when digested. Many of them, however, are concentrates and are particularly rich in protein, fat, carbohydrate, fiber or a combination of these. As examples may be listed: dried milk, soybeans, sheep manure, starch, alfalfa, beef meal, bran and a number of rich mixed feeds. Foaming trouble may be also traced in some cases to specific foam producing substances such as the waxes and sterols of many plant materials; the soluble proteins of blood meal, etc.

Previously, the catalysts for the Kjeldahl nitrogen determination have been added to the digestion in two forms. The first form is the mere measuring out of the correct quantities of the desired catalyst materials and then adding them as loose powders to the digestion liquids. The other form of use has comprised the putting up of the catalyst powders in a tablet having a binder mixed therewith to hold the catalyst powders together. When the loose powders are employed, the operator must measure out the requisite quantities and mix them, which process is inconvenient and time consuming. Additionally, there is the danger of contamination and poisoning from the catalysts themselves. When the tablets employing the binder are used, additional problems arise. The binder itself adds organic material to the digestion mixture which means there is more substance to be oxidized, thereby using up part of the digestion acid. Additionally, the type of organic mixture which is feasible as a binding material usually is of a sort which increases the amount of foaming during the digestion. This latter process materially slows up the digestion. Furthermore, the binding material is apt to contribute to the nitrogen content of the mixture and thus make the determination inaccurate. There is also the possibility that the dropping of the tablet into the flask may break it. The employment of a binder does not eliminate the contamination hazard from the alkali sulphate or mercury and the worker, as in the case of the loose powders, must wear rubber gloves.

A typical example of a catalyst tablet employing binding materials is the following composition:

9 gm. $K_2SO_4$
.35 gm. HgO
.25 gm. dextrin
.5 gm. carbowax ($HOC_2(CH_2OCH_2)_nCH_2OH$) ($n$ averages 66)
.20 gm. powdered wax
.20 gm. mineral oil This particular tablet has the following objectional features: it must be kept in amber bottles; the bottle must be kept closed to avoid nitrogen pickup by the tablets; the tablet is poisonous to the touch; the tablet must be carefully added to the digestion flask in order not to break it; and it is difficult to obtain standardization of the binder.

In two previous applications, Serial No. 315,828, filed October 20, 1952, and Serial No. 371,140, filed July 29, 1953, both now abandoned, I have provided fluid antifoaming substances for addition to the catalysts of the Kjeldahl nitrogen determination to reduce foaming in the nitrogen determination. However, in these instances, the most convenient form of addition of these antifoaming agents to the reaction mixture has been by confining the agents with the catalysts in tablet form. This, again, has necessitated the employment of a binder with the catalysts and antifoams which leads to the additional difficulties hereinbefore set forth. Therefore it has become desirable to provide an effective antifoaming substance for the Kjeldahl nitrogen determination which is not fluid and which does not require that the catalysts and antifoams be put up together in tablet form or with the employment of extra binding materials.

Therefore, an object of the present invention is to provide packaging for the catalysts of the Kjedahl nitrogen determination which provides the catalysts in a convenient form, which greatly reduces the time consumed in adding the catalysts to the Kjeldahl digestion mixture, and completely eliminates the need for weighing out, measuring or mixing of the catalyst materials.

Another object of the invention is to provide an antifoaming substance which, when added to the Kjeldahl nitrogen determination, will materially reduce foaming in the reaction.

Another object of the invention is to provide an antifoaming agent for use in the Kjeldahl nitrogen determination and in combination with the catalysts for said nitrogen determination which is not fluid and which does have to be put up in combination with the catalyst powders in tablet form thereby requiring addition of extra binding materials.

A further object of the present invention is to provide an antifoaming substance which materially reduces foaming in the Kjeldahl nitrogen determination and additionally provides a packaging material for the catalysts of the Kjeldahl nitrogen determination which is inert to the Kjeldahl reaction and soluble in the Kjeldahl reagents.

Another object of this invention is to provide packaging for the Kjeldahl catalysts which completely eliminates any possibility for contaminating the hands of the operator.

A further object it to provide packaging for the Kjeldahl catalysts which add a minimum amount of organic material to the digestion mixture and thus consumes a minimum of the sulphuric acid employed in the digestion.

Another object of this invention is to provide packaging material for the catalysts of the Kjeldahl nitrogen determination which will not cause foaming in the process of the digestion.

Still another object of the present invention is to provide packaging for the Kjeldahl catalysts which does not add nitrogen to the digestion mixture to invalidate the nitrogen determination and which, furthermore, offers no hazard to the digestion containers when the catalysts are added to the digestion mixture.

A further object of the present invention is to provide a catalyst assembly for the Kjeldahl nitrogen determination which comprises the catalysts for the Kjeldahl reaction enclosed in an envelope which is inert to the Kjeldahl reaction, soluble in the Kjeldahl reagents and does not cause foaming in the digestion process.

Yet another object of the present invention is to provide a catalyst assembly for the Kjeldahl nitrogen determination which comprises in combination catalysts for the Kjeldahl reaction contained in a sealed envelope suitable for storage and transportation, said envelope composed of a substance substantially free of nitrogen and soluble in sulphuric acid.

Other and further objects of the present invention will appear in the course of the following description.

In the technology of the Kjeldahl nitrogen determination there are two fundamentally important problems, the solution of which would markedly speed the execution of the nitrogen determination, increase its accuracy and lower its hazard to the operator. These two problems are first, the reduction of foaming in the digestion portion of the Kjeldahl nitrogen determination and, second, the packaging of the catalyst chemicals which are employed in the determination. It has been discovered that a single substance will solve at one stroke both of these major difficulties and thereby provide an effective antifoam agent for the material and marked reduction of foaming in the digestion portion of the determination, particularly for high protein content samples and also furnish a packaging material for the catalyst powders employed in the determination which meets all of the basic requirements for such packaging. This substance is polyethylene, which is a hydrocarbon resin resulting from the polymerization of ethylene. The composition, properties and formulation of polyethylene is given in detail in "The New Plastics," by Herbert R. Simonds and M. H. Bigelow, published by D. W. Van Nostrand Company, Inc., New York, 1945. The information on polyethylene in this volume is given on pages 20–26. It has been discovered that the addition of polyethylene to the Kjeldahl nitrogen determination reaction materially reduces foaming, in fact, to a greater extent than any previously known antifoaming substance employed with the Kjeldahl determination, uniformly on the widest variety of protein substances. Thus, for example, the addition of polyethylene in the nitrogen determination materially reduced foaming with fertilizers, meats of all sorts, liquids of all sorts, tobacco, oil meal, flax seed, and many other substances such as are commonly tested for their nitrogen content with the Kjeldahl nitrogen determination. Additionally, it has been discovered that polyethylene in the form of a sheet may be employed as a packaging material to enclose the catalyst powders which is soluble in the Kjeldahl reagents and inert to the Kjeldahl reaction. Thus, polyethylene is soluble in sulphuric acid at the customary temperatures of the Kjeldahl reaction and is substantially free of nitrogen. The discovery of the antifoaming properties of polyethylene is believed to be completely unique and absolutely unanticipated in any research work previously done with this compound. Additionally, it is believed that the use of this material as a packaging substance for catalysts in the Kjeldahl reaction is completely new and this substance is believed unique in its combined properties of antifoam and packaging material inert to the Kjeldahl reaction and soluble in the Kjeldahl reagents. Polyethylene is thermoplastic in nature and the sheet material employed as a packaging material may be heat sealed by pressing or other similar action.

It has been determined that the catalysts of the determination may be conveniently and successfully packaged in a polyethylene package of the weight of approximately .16 gram and that this amount will also produce the antifoaming effect as described. A specific package (which are mass-produced) was weighted at .1652 gram. This amount or a greater amount added to the digestion either as a package or solid additive produces the antifoam effect (note 1.5 gm. package listed in later table and this package also produced the antifoam effect).

The packaging material of the present invention is necessarily inert to the Kjeldahl reaction in that the material must be substantially free of nitrogen. Additionally, the material must be soluble in the Kjeldahl reagents, which means that the material must be soluble in sulphuric acid heated to the customary temperature and of the concentration customarily employed in the Kjeldahl determination. Additionally, the packaging material must not combine with the Kjeldahl reagents or the catalysts or the protein samples to form undesirable side reactions and, in particular, must not produce foaming in the digestion process. The packaging material is employed in the form of a resilient sealable sheet which encloses the catalyst powders. It is desirable that the packaging material be strong enough to be readily transported and handled without rupture or breakage. Additionally, the packaging material must be unaffected by the catalyst chemicals in storage over a period of time and harmless to the touch.

Two other substances have been found to date which are suitable as packaging materials for the catalysts of the Kjeldahl nitrogen determination. These are vinylidene chloride and paper which has been purified to the point where only traces of nitrogen are present. Vinylidene chloride is a plastic material that may be made in the form of a sheet and, since it is thermoplastic in nature, the sheets may be heat sealed by pressing or other similar action. The paper may be crimped to form a seal or an adhesive which is nitrogen free may be employed, such as the polyvinylacetate adhesives.

Vinylidene chloride is the trade name for vinylidene chloride or unsymmetrical dichloroethylene. A reference describing vinylidene chloride, its composition, properties and formulation is "The New Plastics" by Herbert R. Simonds and M. H. Bigelow (pp. 71–80), published by D. Van Nostrand Company, Inc., New York, 1945.

*General properties of a vinylidene chloride formulation*

| Property | Value |
|---|---|
| Effect of weak acids | None. |
| Effect of strong acids | Darkens in $H_2SO_4$—others none. |
| Effect of weak alkalies | None. |
| Effect of strong alkalies | Affected by $NH_4OH_4$, darkens in caustic, others none. |
| Effect of organic solvents | Highly resistant. |
| Water absorption, ASTM D570–40T | Less than 0.1%. |
| Water permeability | Very low. |
| Burning rate | Self-extinguishing. |
| Thermal conductivity | $2.2 \times 10^{-4}$ cal./sec./sq. cm./° C./cm. |
| Specific heat | 0.316 cal./° C./gm. |
| Index of refraction | 1.61. |
| Specific gravity | 1.70. |
| Volume resistivity, D. C. | $10^{14}$–$10^{16}$ ohm-cms. |
| Dielectric strength, 60 cycles | 500–3000 v./mil. |
| Dielectric constant, 60 cycles | 4. |
| Power factor, 60 cycles | 0.03–0.08. |
| Effect of age | None. |
| Effect of sunlight | Slight. |
| Machinability | Good. |
| Color possibilities | Extensive. |

Paper which has been purified to the point where there is substantially no nitrogen present (essentially pure cellulose) and which has sufficient mechanical strength may be employed as the packaging material. Paper of the type commonly employed in chemical laboratories, as filter paper, is eminently suitable for this purpose in most instances and an example of such a suitable filter paper is E–O filter paper No. 613, manufactured by the Eaton-Dikeman Co., of Mount Holly Springs, Pennsylvania.

The following table gives comparative information for the catalysts of the Kjeldahl nitrogen determination when employed uncombined, in tablet form with conventional inert binders and, furthermore, in the three packaging materials set forth above.

| Sample Determined | Sample Weight, Grams | Catalyst Used | Clearing Time, Minutes | Percentage Nitrogen | Percentage Protein |
|---|---|---|---|---|---|
| Ground beef | 2.69 | .7 gram HgO, 15 grams $K_2SO_4$. | 21 | 2.72 | 17.03 |
| Do | 2.79 | 2 tablets containing .7 gram HgO and 15 grams $K_2SO_4$ binders. | 30 | 2.63 | 16.43 |
| Do | 2.64 | .7 gram HgO, 15 grams $K_2SO_4$ in a vinylidene chloride package weighing .349 gram. | 20 | 2.69 | 16.81 |
| Do | 2.44 | .7 gram HgO, 15 grams $K_2SO_4$ in a .548 gram filter paper package. | 21 | 2.7 | 16.87 |
| Do | 2.49 | .7 gram HgO, 15 grams $K_2SO_4$ in a 1.5 grams polyethylene package. | 30 | 2.58 | 16.13 |

Thus it is seen that an antifoaming substance and packaging material for the Kjeldahl nitrogen determination catalysts have been provided which accomplish all of the objects hereinbefore set forth and which far surpass the conventional form of use of these catalysts in convenience and safety.

From the foregoing, it will be seen that this invention is one well adapted to obtain all of the ends and objects hereinbefore set forth together with other advantages which are obvious and which are inherent to the composition.

As many possible embodiments may be made of the invention without departing from the scope thereof, it is to be interpreted that all matter herein set forth is illustrative and is not to be interpreted in a limiting sense.

Having thus described my invention, I claim:

1. A process of minimizing the production of foam in the Kjeldahl nitrogen determination comprising the step of adding thereto a polyethylene soluble in the Kjeldahl reagents.

2. A process of minimizing the production of foam in the Kjeldahl nitrogen determination comprising the step of adding polyethylene to the Kjeldahl nitrogen determination in the digestion phase thereof.

References Cited in the file of this patent

UNITED STATES PATENTS

| | | |
|---|---|---|
| 2,609,344 | Johnson | Sept. 2, 1952 |
| 2,700,461 | Smith | Jan. 25, 1955 |

OTHER REFERENCES

"Commercial Organic Analysis," by A. H. Allen, 3rd ed., vol. 1, 1898, pages 45–52.

"Polyethylene," published by E. I. du Pont de Nemours & Co., Plastics Dept., Arlington, New Jersey, April 1956, page 22.